Dec. 17, 1968 M. CAMRAS 3,416,949
LOW NOISE RECORD MEDIUM AND METHOD FOR PRODUCING THE SAME
Filed Aug. 2, 1965
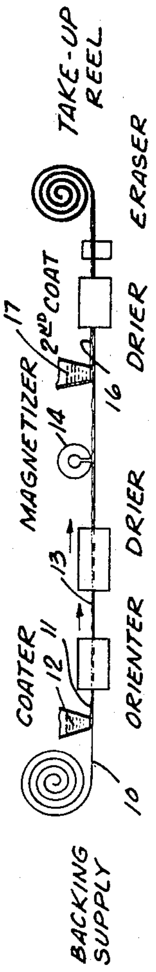
INVENTOR.
MARVIN CAMRAS
BY Hill, Sherman, Meroni, Gross & Simpson
ATTORNEYS

United States Patent Office 3,416,949
Patented Dec. 17, 1968

3,416,949
LOW NOISE RECORD MEDIUM AND METHOD FOR PRODUCING THE SAME

Marvin Camras, Glencoe, Ill., assignor to IIT Research Institute, Chicago, Ill., a corporation of Illinois

Filed Aug. 2, 1965, Ser. No. 476,378
7 Claims. (Cl. 117—93.2)

ABSTRACT OF THE DISCLOSURE

A method for reducing the noise level of a magnetic record medium to reduce the noise level thereof and to applying a second coat of magnetizable material to the active surface of the tape, and fixing the second coat after it has had an opportunity to neutralize any leakage fields from the tape.

This invention relates to a method of treating a magnetic record medium to reduce the noise level thereof and to the article produced by such method.

In present commercial magnetic record media, a definite noise level is observable even after the record medium has been subjected to the best available demagnetizing equipment. Such noise may be noticeable in audio or video recordings where the recorded signal is momentarily at a zero level. In computer applications and the like, the noise level of the record medium may contribute to errors in reading recorded data.

It is, therefore, an object of the present invention to provide a method for reducing the noise level of magnetic record media, and to provide an improved magnetic record member exhibiting a reduced noise level.

The single figure is a diagrammatic view illustrating a preferred method of producing a magnetic record medium in accordance with the present invention.

After coating a magnetic tape base 10 with a first layer 11 of material 12, which may be oriented or in general treated as in usual coating techniques, the tape 13 is magnetized preferably by recording on it with a D-C or permanent magnet 14 having a field direction corresponding to the direction of magnetization in which recordings will be made. Alternatively the first layer is magnetized vertically or in a direction to give appreciable vertical component. A second coat 16 of material 17 is applied over the magnetized coat, which second coat can contain the same magnetic material as the first, or a finer material. The magnetic material of the second coat 16 comprises particles having a density substantially less than the density of the material of the first coat but having comparable, that is about the same, coercive force as the material of the first coat. The magnetic material of the second coat 16 is especially attracted to portions of the main coat 11 which exhibit a strong local field; that is to portions which would give noise upon reproduction. The result of this filling-in is a quieter recording tape.

A third coat, etc., may be used in the same way. The under-coating supplies an orienting field for the subsequent coating, and also tends to compact the latter. Agitation may be provided so that the later coat can best fill in. Alternatively, a coat can be applied by a settling out process from a suspension so that deposition can best find the magnetized spots (very dilute solution, with little or no binder). An overcoat such as 16 thinner than the main undercoat such as 11 can be burnished in or have adhesive applied later. Benefits may be obtained by this preferential filling in of noisy places even on a demagnetized tape.

It was verified that a magnetized coating attracting a superposed layer of fine particles will be neutralized. A magnetic record was developed out with a fine particle suspension and gave a strong pattern. It was subjected to a suspension separated by a thin Mylar film (experiment A) but no noticeable pattern developed above the Mylar. The same experiment was repeated after the previously developed pattern had been (mechanically) wiped off. A pattern now appeared above the Mylar (experiment B). In experiment A, the magnetic particles of the first developed pattern acted to neutralize the tape field and prevent further attraction of particles.

The record medium to be treated may be formed in any of the ways described in my U.S. Patent No. 3,185,775, and the particles used in eliminating noise may correspond to those used for the outer layer 33, 33′ and 33″ in said patent.

It will be apparent that many modifications and variations may be effected without departing from the scope of the novel concepts of the present invention.

I claim as my invention:

1. The method of treating a magnetic record medium to reduce the noise level exhibited thereby which comprises:

applying magnetic particles to a magnetizable surface of the record medium and maintaining the particles in a mobile condition and within and subject to the influence of noise producing fields existing at said magnetizable surface for a substantial time interval to provide for differential attraction of the particles to sources of substantial noise in the record medium, and thereafter fixing said particles to said record medium as an integral part thereof.

2. A magnetic record medium as produced by the method of claim 1.

3. The method of making a magnetic record which comprises:

applying a layer of magnetizable particles in a binder to a non-magnetic base and placing the particles in a substantially immobile condition, thereafter subjecting the substantially immobile particles of the layer to a magnetizing field, then applying further magnetic particles in a mobile condition to a surface of the magnetized record member while accommodating the differential attraction of the particles to sources of substantial noise in said layer, and thereafter fixing said particles to said surface as an integral part of said record medium.

4. The method of treating a magnetic record medium to reduce the noise level exhibited by the record medium which comprises:

magnetizing the magnetic record medium, applying magnetizable particles in a mobile condition to a surface of the magnetized record medium, maintaining the particles in such mobile condition for a substantial time interval to provide for differential attraction of the particles to sources of substantial noise in the record medium, and thereafter fixing said particles to said record medium as an integral part thereof.

5. The method of claim 1 wherein the magnetic particles applied have a coercive force comparable to the coercive force of the magnetic material below said magnetizable surface of said record medium.

6. The method of claim 1 wherein said particles are retained fixed to said record medium by means of a nonmagnetic binder to form a smooth active surface for scanning contact by a transducer head and wherein the density of said particles is substantially less than the density of magnetic material below said magnetizable surface of said record medium, and wherein said particles occupy a layer substantially thinner than the layer of magnetizable material below said magnetizable surface.

7. The method of treating a magnetic record tape to reduce external fields at the active surface thereof when demagnetized which comprises:

magnetizing an original layer of magnetizable particles in a longitudinal direction with respect to the direction of movement of the record tape, applying a further relatively thin layer of magnetizable particles in a mobile condition to the active surface of the magnetized record tape, maintaining the further magnetizable particles in such mobile condition for a substantial time interval to provide for differential attraction of the particles in accordance wih any external magnetic fields at said active surface, and fixing said further magnetizable particles to said active surface of said record medium as a further layer which is substantially thinner than the original layer of magnetizable material of said tape.

References Cited

UNITED STATES PATENTS

| | | | |
|---|---|---|---|
| 3,001,891 | 9/1961 | Stoller | 117—93.2 |
| 3,052,567 | 9/1962 | Gabor et al. | |
| 3,149,996 | 9/1964 | Wagner et al. | 274—41.4 |
| 3,185,775 | 5/1965 | Camras | 117—76 XR |
| 3,222,205 | 12/1965 | Karalus | 117—93.2 |

ALFRED L. LEAVITT, *Primary Examiner.*

J. H. NEWSOME, *Assistant Examiner.*

U.S. Cl. X.R.

117—76, 121; 274—41.4